Oct. 29, 1963 W. McGUIRE 3,108,389
FISH LURE
Filed June 22, 1960
FIG_1
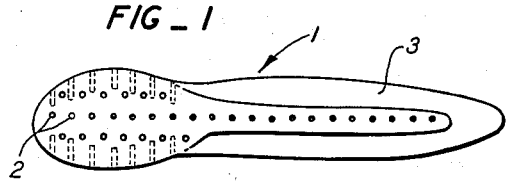
FIG_2
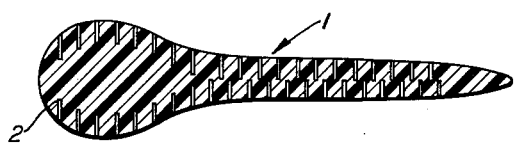
FIG_3
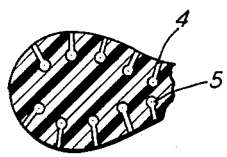
FIG_4
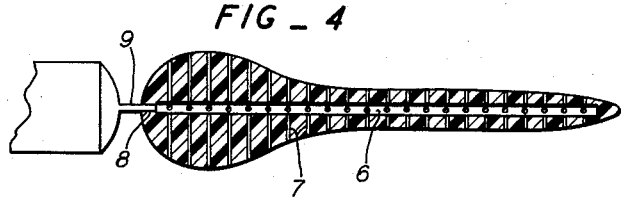
FIG_5
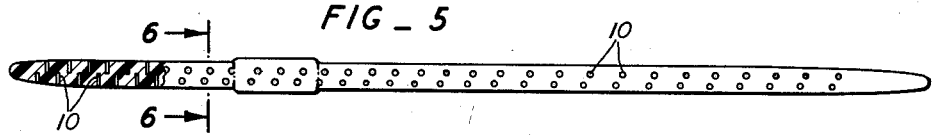
FIG_7
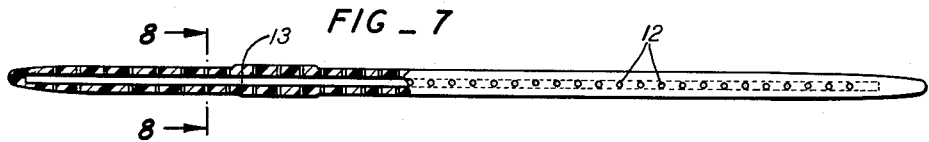
FIG_6
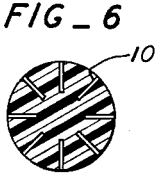
FIG_8
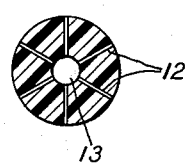
INVENTOR.
WAYNE McGUIRE
BY Boyken, Mohler + Wood
ATTORNEYS

United States Patent Office 3,108,389
Patented Oct. 29, 1963

3,108,389
FISH LURE
Wayne McGuire, 321 North Gate Road,
Walnut Creek, Calif.
Filed June 22, 1960, Ser. No. 37,878
1 Claim. (Cl. 43—42.06)

This invention relates to a fish lure and has for one of its objects the provision of a fish lure that is adapted to carry a liquid fish attracter, such as liver oil or other liquid attracters found to attract fish, and which lure is so constructed as to enable such liquid to be very slowly diffused into the water and to be expelled when the lure is nibbled so as to tempt the fish to take the lure and hook.

Another object of the invention is the provision of fish lures that are adapted to more closely simulate in appearance and texture the various natural baits heretofore used, such as salmon egg clusters, sardine chunks, tadpoles, crawlers, worms, eels, etc., and which lures are constructed to be quickly and easily charged with any desired liquid fish attracter, and when so charged the liquid will be held within the body of the bait in capillary passageways that open outwardly of such body at one of their ends so that such liquid will be in direct contact with the water at said outwardly open ends to more effectively attract fish than heretofore.

Heretofore many attempts have been made to incorporate odorous material into the bodies of plastic lures with the expectation that the odor alone would attract the fish. This expedient was intended to overcome the objection to the short period in which liquid attracters are effective when they are rubbed onto the lures. However, there has been no successful substitute for the actual use of the fish attracter, which not only provides the odor desired but the taste. However, as mentioned, the liquid fish attracter when rubbed onto the bait soon loses its effectiveness.

The present invention provides a structure that not only uses any of the liquid fish attracters, but retains it for long periods of time without diminution in its effectiveness, and which structure lends itself to easy loading or charging the lure therewith, but it holds said attracter in such a manner that a small quantity will be expelled from the lure upon application of pressure on the surface of the lure such as occurs when a fish may be nibbling at the lure. The attracter when so expelled usually encourages the fish to take the lure and hook, when otherwise it would not do so.

Other objects and advantages will appear in the description and in the drawings.

In the drawings,

FIG. 1 is an enlarged side elevational view of a lure formed to simulate the appearance of a tadpole.

FIG. 2 is a vertical sectional view taken through the lure of FIG. 1 longitudinally thereof.

FIG. 3 is a fragmentary sectional view showing a slightly different structure than is shown in FIG. 2.

FIG. 4 is a vertical sectional view similar to that of FIG. 2 but showing a still further modification of the structure that is shown in FIG. 2.

FIG. 5 is a side elevational view of a lure that simulates a crawler, worm or eel in appearance, and that uses the same structure for holding the fish attracter as is shown in FIG. 2.

FIG. 6 is an enlarged sectional view taken along line 6—6 of FIG. 5.

FIG. 7 is a part sectional part elevational view of a modification of the lure of FIGS. 5 and 6 that corresponds generally with the type of attracter holding structure shown in FIG. 5.

FIG. 8 is an enlarged sectional view taken along line 8—8 of FIG. 7.

Referring to the lure of FIGS. 1 and 2 the body of said lure, generally designated 1, is of relatively soft, flexible, resilient, rubber-like material that is also relatively tough. One such material is a polyvinyl chloride plastisol that has heretofore been used for lures, since it has the desired characteristics for simulating the appearance, texture and other qualities of the different baits that may be used. Also it is impervious to deterioration from contact with oils and other materials that may be used in liquid fish attracters, and it is waterproof.

A further characteristic of the material of the lure is that the fisherman may attach the lure to a hook or hooks in the same manner as natural bait is attached, although in the present instance the lure will be relatively permanent, as compared with natural bait.

The body 1 of FIGS. 1 and 2 is formed with a plurality of elongated capillary passageways 2 that open outwardly of the outer surface of the body at one of their ends, while the opposite or other ends of said passageways terminate within the body 1. These passageways may be of any desired length, or of different lengths in the same body. They may also be so distributed as to provide an outer open end of a passageway in most parts of the body, including the tail 3, which in the case of the tadpole lure, may have a centrally thickened portion longitudinally thereof in which some of the passageways may be positioned.

The distribution of the passageways is such as to not impair or change the relatively firm characteristic of the surface of the lure. However, the provision of the passageways in the outer layer of the body increases the flexibility of the body, which is desirable.

In order to charge the passageways 2 with the desired fish attracter, the body 1 may be squeezed between the fingers of the hand to expel the air from said passageways, and when the pressure is released, with the lure being positioned within a body of such liquid attracter, the capillary passageways will be filled with the liquid. Or any desired implement may be used to squeeze the body of the lure while it is immersed in the liquid fish attracter to expel the air and permit the passageways to fill with the liquid when the squeezing pressure is released. This charging of the passageways is substantially as readily accomplished when the lure has one or more hooks attached thereto as when it is free from hooks.

The passageways 2 may be formed in any suitable manner, such as by being molded into the body at the time the body is molded, or by drilling, or by use of heated pins or by use of soluble core pins, any of which methods are old in the art of molding.

FIG. 3 shows capillary passageways 4 having their inner closed ends enlarged, as at 5, which enlargements provide supplying reservoirs, each adapted to hold a supply of the fish attracter for each passageway.

The lure of FIG. 3 is charged with the liquid fish attracter in the same manner as the lure of FIGS. 1, 2. These passageways may be of any desired length, although, preferably, the enlarged portions 5 should not be so deeply positioned within the body as to make their collapse difficult, when external pressure is applied in the charging or loading operation.

In the view shown in FIG. 4, a central employed passageway 6 is formed in the body of the lure, and capillary passageways 7 may extend radially therefrom to open outwardly of the body at their outer ends. The one end 8 of passageway 6 is preferably closed except that the wall closing it may be slit, as at 8, to enable a discharge nozzle 9 to be inserted into the end of said passageway for filling the latter. Such nozzle may be on a flexible walled container for the liquid, in which the liquid is discharged upon squeezing the container. When the nozzle is withdrawn the walls defining the sides of the slit 8 will automatically come together to hold the liquid in passageway 6, except for feeding of the liquid to the capillary passageways.

FIGS. 5, 6 show structure similar to that of FIGS. 1, 2 except that the form of the lure is different. The capillary passageways 10 are the same as passageways 2. Obviously the structure of passageways having enlarged inner ends, as seen in FIG. 3 may be used in a lure of any form.

FIGS. 7, 8 show the capillary passageways 12 communicating with a central enlarged supply chamber 13, therefore this structure is the same as used in the form of lure shown in FIG. 4.

It is seen that lures having the structure above described will add odor and taste to the lures that heretofore have relied for their efficiency on merely shape, action and color. The present lure still retains the advantages of shape, action, color and texture that are present in the soft plastic lures. The desired flavor characteristics of natural bait such as sardine chunks, sardine fillets, grasshoppers, abalone chunks, anchovies, whole sardines, etc. may be readily provided for lures that simulate these natural baits in appearance, color, and texture, and the present soft, flexible, resilient plastic material enables such simulation in appearance, color and texture. Obviously any liquid attracter may be used with any lure.

The cross sectional contours of the passageways is not material. It is preferable, however, that the inner ends of the passageways be closed to prevent too rapid a discharge of the liquid attracter.

However, as has been mentioned, the open ends of the passageways preferably should be distributed so that the fish attracter will be discharged into the water irrespective of where the fish may bite.

The capillary passageways are of a diameter that restrict the free flow of the liquid attracter out of the passageways, while permitting access of water to the liquid so there will be a slow dissipation of the liquid attracter in the water. The flexibility of the lure and its action in the water assists in this dissipation, and since the existence of the passageways adds to the flexibility of the lure, the passageways perform several functions. When the lure is drawn through the water there is also an added tendency for the liquid attracter to be drawn out of the passageways and into the water, but the fact that the passageways are closed at their inner ends restricts too rapid a withdrawal.

It is to be understood that the invention is capable of modifications and variations from the forms shown, so that its scope should be limited only by the the scope of the claim appended hereto.

I claim:

A fish lure comprising:
(a) an integral body of moisture impervious, soft, resilient, rubber-like, non-porous material having substantially the appearance, form and texture of natural fish bait;
(b) the outer surface of said body being formed with a plurality of spaced, outwardly opening, separate recesses, the walls of which are impervious to the passage of liquid therethrough, each recess terminating within said body and each recess being adapted to be filled with a liquid fish attracter;
(c) the outer open end of each recess being at the outer surface of said body and each recess being of a sufficiently small diameter to retain such fish attracter within each recess against freely flowing therefrom but in direct contact with the water in which the lure is adapted to be positioned for relatively slow dissemination of said liquid into the water;
(d) each of said recesses extending into said body in a direction substantially at a right angle to the outer surface of said body at the open outer end of each recess; and
(e) each recess terminating within said body in a closed inner end.

References Cited in the file of this patent

UNITED STATES PATENTS

| | | |
|---|---|---|
| 1,961,539 | White | June 5, 1934 |
| 2,129,245 | Stenstrom | Sept. 6, 1938 |
| 2,742,731 | Lovelace | Apr. 24, 1956 |
| 2,869,279 | Pretorius | Jan. 20, 1959 |